No. 638,262. Patented Dec. 5, 1899.
E. W. McGUIRE.
ROLLER BEARING FOR LAWN MOWERS.
(Application filed Oct. 10, 1898.)

(No Model.)

Witnesses
Inventor
Elmer W. McGuire

UNITED STATES PATENT OFFICE.

ELWOOD W. McGUIRE, OF RICHMOND, INDIANA.

ROLLER-BEARING FOR LAWN-MOWERS.

SPECIFICATION forming part of Letters Patent No. 638,262, dated December 5, 1899.

Application filed October 10, 1898. Serial No. 693,094. (No model.)

*To all whom it may concern:*

Be it known that I, ELWOOD W. MCGUIRE, residing at Richmond, in the county of Wayne and State of Indiana, have invented certain new and useful Improvements in Roller-Bearings for Lawn-Mowers, of which the following is a specification.

The object of my invention is to provide ball-bearing journals for lawn-mowers.

The features of my invention are more fully set forth in the description of the accompanying drawings, making a part of this specification, in which—

Figure 1:
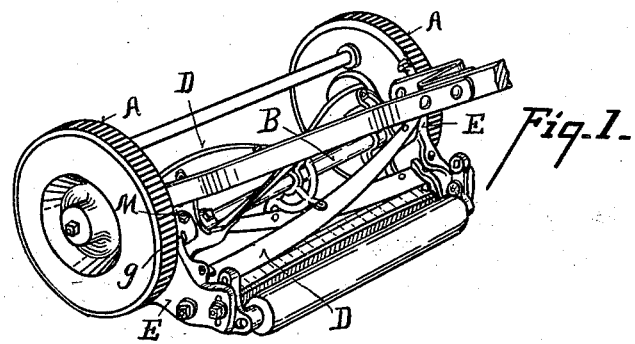
Figure 2:
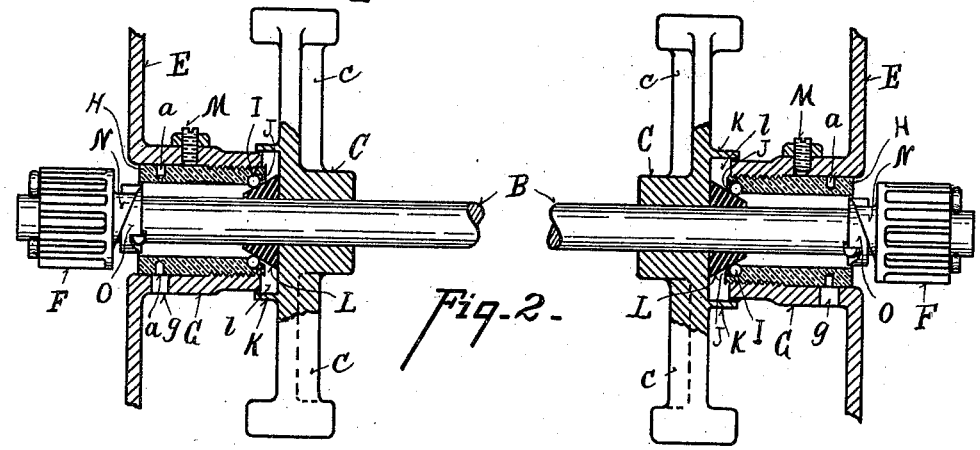
Figures 3, 4, 5:
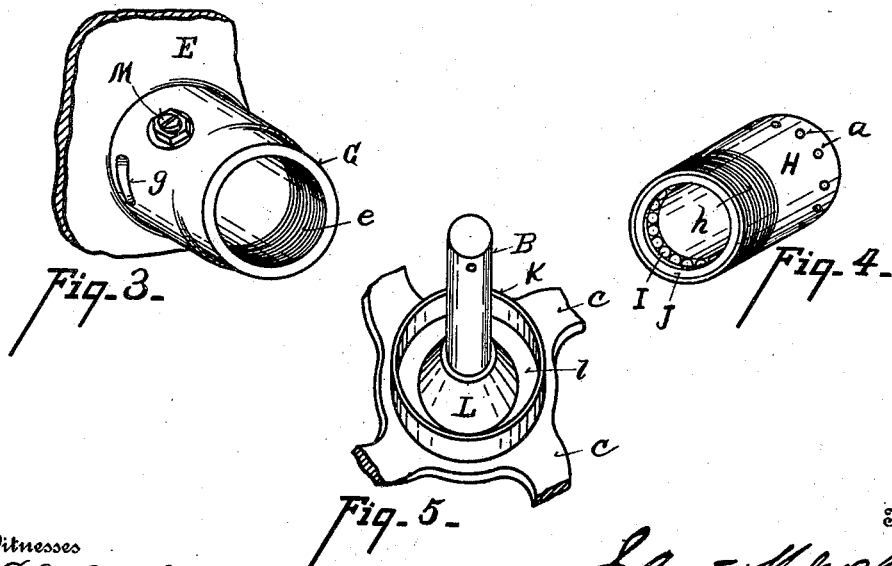

Figure 1 is a perspective view of a lawn-mower with my invention applied thereto. Fig. 2 is a central vertical section through the journal-boxes, showing the shaft and gear in elevation. Fig. 3 is a perspective view of the journal-sleeve. Fig. 4 is a perspective view of the inner adjusting-sleeve with the balls located therein. Fig. 5 is a perspective view of one of the knife-shaft hubs.

A A represent the ground-wheels; B, the knife-shaft; C, hubs rigidly secured to the knife-shaft, and c the arms of said hub, to which the knives D are attached.

It is essential in a lawn-mower to provide an adjustment of the journal-supports to prevent end play of the shaft when balls are used for a journal-bearing. It is also essential that this adjustment is readily made from the outside without taking the knife-shaft out of its bearing.

I have devised the following means for providing the ball-bearing journal and their various attachments, so that they can be properly utilized in a lawn-mower.

E E represent the brackets or side frames of the mower.

F F represent the driving-gears, mounted on the revolving knife-shaft, which mesh with the internal driving-gear of the ground-wheels.

G represents the sleeve of the journal, which is rigidly attached to or integral with the respective brackets E E. The inner bore of this bracket is screw-threaded. It is provided with a slot $g$ at its outer end (see Fig. 3) for a purpose hereinafter explained.

H represents an internal sleeve screw-threaded on its exterior. These threads $h$ engage with the female thread $e$ of the sleeve G.

The inner end of said sleeve H is recessed, providing a seat for the balls I.

J represents a bevel-ring seated within the end of sleeve H, holding the balls in position. It will thus be seen that the balls are held practically in an annular recess of the sleeve H.

The knife-shaft hubs are each provided with a short cylinder K upon their outer ends.

L represents cones secured upon the shaft and seating against the ends of the hub within the short cylinder K. The sleeve G, carrying the sleeve H adjustably connected thereto, projects into the annulus formed by the short cylinder K. The balls I abut the cone L. The cones being rigidly fixed to the shaft receive the thrust of the balls carried by the sleeve H.

In order that the sleeve and balls may be adjusted endwise to the cone-journals on the shaft, the sleeves H are provided with a series of holes $a$. These holes are arranged opposite the slots $g$, so that a tool may be inserted in said holes and turn the sleeve H. This extends the sleeve inwardly or outwardly, as the case may be, so that the shaft will have little or no endwise play.

In order to hold the journals in their adjusted positions, I provide a set-screw M, which taps through the sleeve G and bears against the sleeve H, thereby holding it in its adjusted position.

In the drawings I have shown the sleeves G made integral with the brackets E, but the mode of connecting these two members rigidly together is immaterial.

It will be observed that the slot $g$ is of ready access when the knife is in position on the lawn-mower, so that either of the sleeves H can be readily adjusted longitudinally within its sleeve G at any time to take up lost motion in case of wear.

N O represent clutch members interposed between the gear and sleeves for connecting and disconnecting the shaft to the gear-wheel for driving the shaft or otherwise, as occasion may require. The form of clutch employed is not material.

It will be seen that by projecting the sleeves G inwardly from the frame means are afforded for supporting the sleeves threaded therein and for adjusting the same longitudinally without taking off the pinions F and without taking the wheels off. By securing the ball-bearings between the hubs, which support the knives and the pinions which mesh with the internal gear of the wheels A, the sleeves carrying the balls may be adjusted so as to prevent lost motion or endwise movement of the driving-shaft B. The opening of the sleeves to allow a tool engagement with the interior sleeve allows them to be readily turned in either direction for adjustment. The cones L are preferably fastened to the shaft. It is essential that the shaft, the knife-hubs C, and the cones L should revolve together. The precise means of accomplishing this is immaterial.

Having described my invention, what I claim is—

In a journal-bearing the combination of a shaft, a cone supported on the shaft, a sleeve-support, a sleeve screw-threaded therein, there being an annular recess in the inner end of said sleeve, balls located therein, a ring seated in said sleeve engaging said balls, the cone on the shaft being projected into the inner end of the sleeve and engaging the balls, a clamping-screw in the sleeve-support engaging the sleeve, there being turning-holes in the sleeve and an oppositely-disposed slot in the support, whereby the bearings may be adjusted without dismemberment of the parts, substantially as specified.

In testimony whereof I have hereunto set my hand.

ELWOOD W. McGUIRE.

Witnesses:
C. W. MILES,
OLIVER B. KAISER.